United States Patent [19]

Hilt

[11] 4,278,413

[45] Jul. 14, 1981

[54] APPARATUS FOR INVERTING TIRES

[75] Inventor: Merlyn R. Hilt, St. Francis, Kans.

[73] Assignee: Hilt Tire Feedbunk, Inc., St. Francis, Kans.

[21] Appl. No.: 76,970

[22] Filed: Sep. 20, 1979

[51] Int. Cl.³ .................. B29C 17/00; B29C 21/00
[52] U.S. Cl. ................................ 425/383; 425/11; 425/305.1; 425/445; 264/295; 264/334; 83/54; 82/46; 82/101; 157/13
[58] Field of Search .............. 425/28, 11, 12, 289, 425/302.1, 304, 305.1, 324.1, 383, 394, 397, 445, 446, 470, 318, DIG. 46; 264/295, 224, 334

[56] References Cited

U.S. PATENT DOCUMENTS

| | | | |
|---|---|---|---|
| 2,843,877 | 7/1958 | Wolfe | 425/11 |
| 2,866,229 | 12/1958 | Scholl | 425/318 |
| 3,358,332 | 12/1967 | Downey | 425/394 |
| 3,635,610 | 1/1972 | Hall et al. | 425/11 |
| 3,865,577 | 2/1975 | McGehee et al. | 425/11 |
| 3,927,164 | 12/1975 | Shimabukaro | 264/295 X |
| 3,995,826 | 12/1976 | Saunders | 425/318 X |

Primary Examiner—J. Howard Flint, Jr.
Attorney, Agent, or Firm—Gratton & Ebel

[57] ABSTRACT

Method and apparatus for inverting a torroidal article such as a tractor tire, comprising: a base assembly; a first frame assembly pivotably rearwardly attached to the base assembly; a second frame assembly pivotably attached to a forward portion of the first frame assembly; a tire holder attached to the second frame assembly; and grappling means for holding an edge portion of a tire to be inverted relative to the base assembly. The tire holder is rotatable to permit the removal of a rim portion of the tire on the tire holder by a cutting blade fixed on a boom attached to the apparatus. Rotation of the tire holder is actuated by a hydraulic motor, and hydraulic cylinders are used to pivot the first frame assembly and the second frame assembly. The apparatus is made portable, with a minimum of necessary external support systems, such as a hydraulic fluid pump. The article thus produced has a generally cylindrical shape, smoothed by clamping means, making it useful as a feed bunk for livestock.

14 Claims, 4 Drawing Figures

4,278,413

APPARATUS FOR INVERTING TIRES

BACKGROUND OF THE INVENTION

1. Field of the Invention

The present invention relates to an apparatus for manipulating deformable torroidal objects, namely tires, by turning them inside out.

2. Description of the Prior Art

To the inventor's knowledge, no mechanical device has heretofore been developed for inverting torroidal objects. The problem of what to do with used tires has mainly been solved by recapping tire casings or by using the tires as flower planters, buoys, etc. The present invention converts discarded tires, such a tractor tires, into useful objects such as feed bunks. When a tire is inverted according to the present invention, its axial depth is greatly increased as it assumes the general shape of a cylinder with an inwardly tapered lip. Such an article is useful as a feed bunk in that it can hold one or more bales of hay, ground hay, silage, grain, etc. Such a feed bunk prevents feed from being scattered by feeding cattle, prevents loose material from blowing, and can be easily relocated by rolling it on its edge.

SUMMARY OF THE INVENTION

Figure 1:
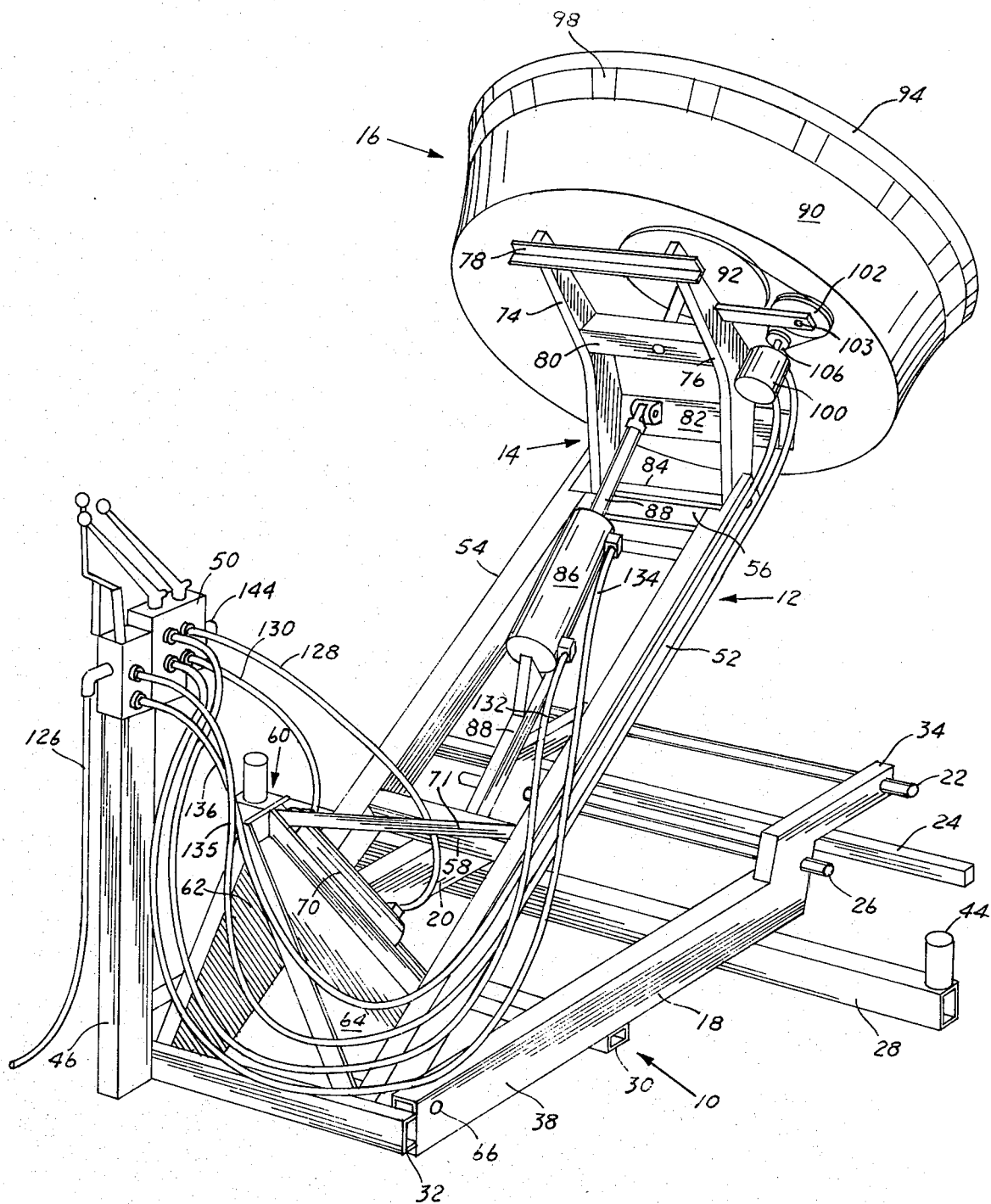
FIG. 1 is a rear perspective view of an apparatus of the present invention, with parts removed for clarity.

The present invention provides an apparatus for forming an inverted tire, the apparatus comprising: tire holding means; grappling means; first tire moving means; and second tire moving means. The tire holding means comprises an annular member on which a first side of a tire to be inverted may rest near a rim of that tire. The grappling means preferably comprises a number of hooks on lengths of chain fixed relative to the tire holding means. The first tire holding means moves a tire on the tire holder through a first acute angle of rotation with a first vertex radially spaced from the tire. The second tire moving means moves the tire on the tire holder from the angle of the first tire moving means through a second acute angle of rotation with a second vertex radially intermediate of the tire. The two angles are coplanar with opposing vertices, the initial side of the second angle being colinear with the terminal side of the first angle. The first tire moving means comprises a first arm pivotably connected to a base assembly and raised by a first hydraulic piston. The second tire moving means comprises a second arm pivotably connected to the first arm at an end of the first arm opposite the end connected to the base assembly and pivoted relative to the first arm by a second hydraulic cylinder.

The present invention also comprises means for rotating the annular member and tire thereon and a fixed cutting blade on a boom demountably attached to the base assembly for removing a rim portion prior to tire inversion by cutting the tire as it is rotated on the annular member. Thus, the method comprises the steps of: Placing the tire on a tire holder; removing a rim portion of the tire to form an edge portion; securing the edge portion with grappling means; moving the tire in a first axially and radially angled direction; and moving the tire in a second axially and radially angled direction to invert the tire. After the tire is inverted, a clamping means is used on the inner and outer surfaces of the tire to smooth out the tire. The article thus produced is of a generally cylindrical shape with an inwardly tapered lip.

DESCRIPTION OF THE PREFERRED EMBODIMENT

The present apparatus generally comprises a base assembly 10, a first arm assembly 12, a second arm assembly 14, a tire holder 16, and grappling means.

The base assembly 10 comprises a rectangular frame and a control support extending upwardly from a rearward end of the rectangular frame. The rectangular frame is formed of tubular steel, rests on the ground or on a truck bed and supports the apparatus. It comprises two parallel main beams 18, 20 and a number of cross members 22, 24, 26, 28, 30, 32. Each main beam 18, 20 has attached thereto a number of parallel channel members, including a forwardly extending upper member 34 for support of cross members 22, 24, and a lower support member 38 for supporting the frame. The frame rests on cross members 28, 30 fixed to intermediate portions of the main beams 18, 20. The cross member 28 extends outwardly beyond the frame for lateral support and comprises upwardly extending member 44 for chain support. Cross member 32 extends across the rearmost ends of the main beams and has affixed thereto an upright arm 46 which provides support for control boxes 48, 50.

The first arm assembly 12 comprises a pair of linear, parallel, tubular steel main arms 52, 54 which extend in length a distance equal to a substantial length of the frame. The first arm assembly 12 is reinforced by a forward first cross brace 56, an intermediate second cross brace 58 and a cantilevered cross brace 60. The cantilevered cross brace 60 is located at a rearmost portion of the first arm assembly 12 and comprises a pair of deltoid members 62, 64 each extending from a base portion fixed to a main arm 52, 54 and joined to the other at its apex. The main arms 52, 54 are pivotally connected to the parallel main beams 18, 20, inwardly of the frame, through pins 66, 68 in a rearward portion of the main beams and main arms to permit pivoting of the first arm assembly about the pins in an angle of rotation from an initial position adjacent the frame assembly to a terminal position acutely and upwardly angled relative thereto.

The pivoting motion of the first arm assembly 12 relative to the base 10 is brought about by a first hydraulic cylinder 70 having a rod 72 extending forwardly downwardly to the frame cross member 30 from a cylinder body pivotally attached to the apex of the cantilevered cross brace 60. A forwardly angled brace 71 extends between the cantilevered brace 60 and a main arm to further support the cantilevered brace against the force of extension of the cylinder 70.

The second arm assembly 14 comprises a parallel pair of angled arms 74, 76 and forward, intermediate and rearward parallel cross ties 78, 80, 82. The angled arms 74, 76 each comprise a central, rearwardly angled portion to provide clearance for the pivotal movement of the tire holder with the second arm assembly. Each angled arm 74, 76 is pivotally joined at a lower end to the first arm assembly 12, forwardly of cross brace 56, through a cylindrical rod 84 extending through the main arms 52, 54 and the angled arms. Rearward cross tie 82 extends between the angled arms 74, 76 in a position along their lengths between their angled portions and the rod 84. Intermediate cross tie 80 extends between the angled arms 74, 76 in the vicinity of their angled portion, and the forward cross tie 78 extends across top portions of the angled arms.

The pivoting motion of the second arm assembly 14 relative to the first arm assembly 12 is brought about by a second hydraulic cylinder 86 parallel to the main arms of both assemblies and rearwardly mounted on a strut 88 extending forwardly from the intermediate cross brace 58 and parallel to the second arm assembly main arms 52, 54. The cylinder 86 is pivotally attached to the strut 88 and contains a rod 88 forwardly pivotally attached to the rearward cross tie 82 so that extension of the rod 88 pivots the second arm assembly relative to the first about rod 88 from an initial position adjacent the first arm assembly 12 to a terminal position rearwardly upwardly angled relative thereto.

The tire holder 16 comprises a main disc 90, a hub 92 in the center of the disc, an annular member 94 mounted to the main disc, and means for rotating the tire holder. The present apparatus is designed to accept several tire holder sizes, depending on the size of the tire to be inverted. The main disc 90 is sturdily constructed of an element approximating the internal diameter of the tire to be inverted, such as a wheel approximately sized for the tire to be inverted. The hub 92 is located in the center of the main disc and has rotatably attached thereto a stub shaft 96 extending axially from the center of an underside of the hub to a fixed mounting on the intermediate cross tie 80 to rotatably mount and space the main disc 90 upwardly from the second arm assembly 14 to permit rotation of the tire holder. The annular member 94 comprises a relatively small diameter steel tube formed into a circle of a diameter slightly greater than that of a circle formed by a rim of a tire to be inverted. The annular member 94 is mounted on the main disc 90 by a plurality of circumferentially spaced radially and axially outwardly extending braces 98. Means for rotating the tire holder 16 comprise a hydraulic motor 100 mounted on the angled arm 76. The hydraulic motor comprises a rotatable wheel 106 which engages a roller chain connected to a drive wheel 102. The drive wheel 102 is rotatably mounted on a stub shaft 103 fixed to the angled arm 76 forwardly of the hydraulic motor 100. The roller chain between the wheel 106 and drive wheel 102 drivingly engages outer teeth on drive wheel 102. Another roller chain is drivingly engaged between an inner sprocket on the drive wheel 102 and a toothed periphery of hub 92. The disc 90 is thus rotated by the hub 92 when the motor 100 is driven.

Figure 3:
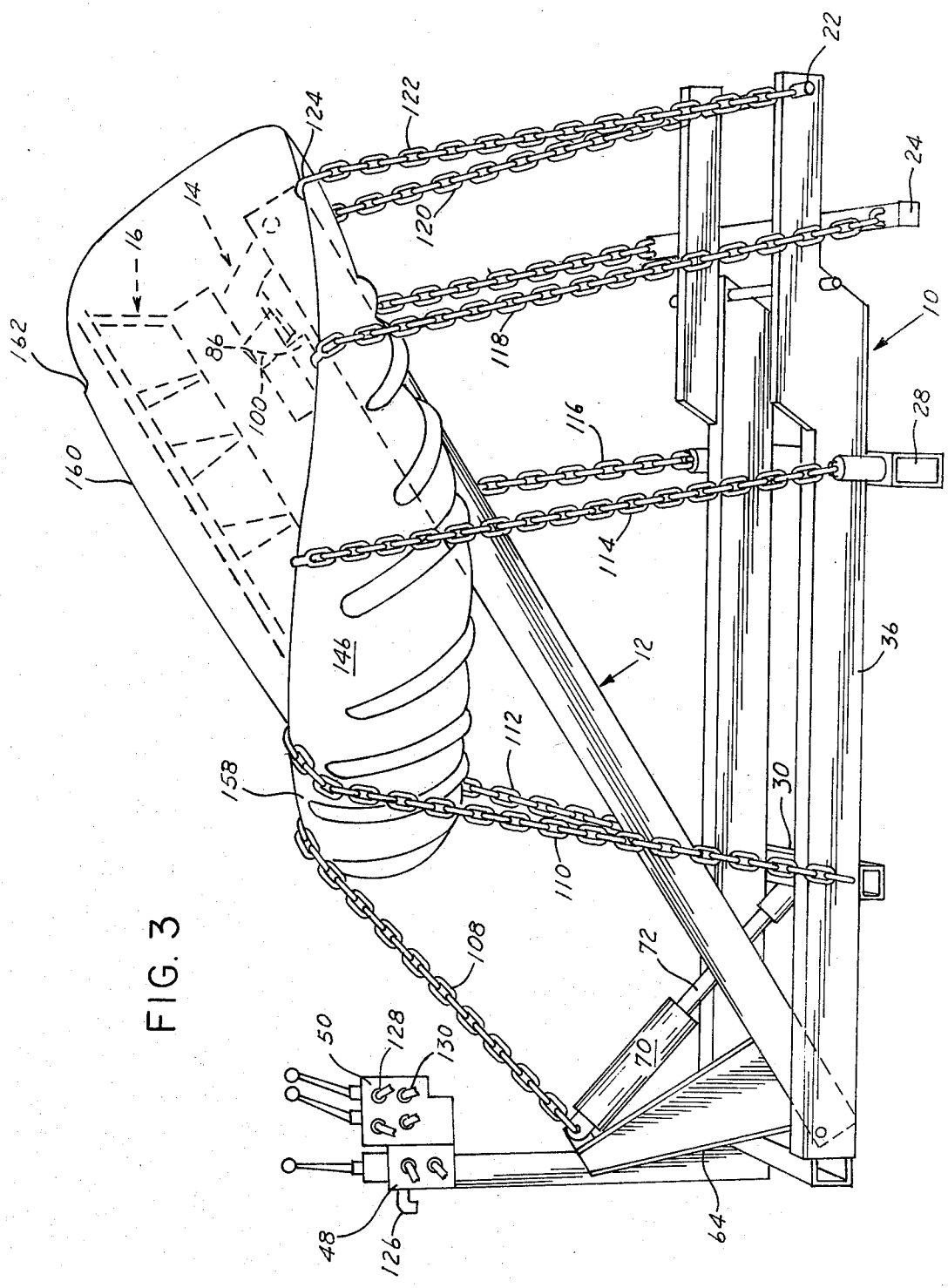
FIG. 3 is a side view of the apparatus of FIG. 2 in an intermediate stage of tire inversion, with parts removed for clarity.

The grappling means, FIG. 3, comprise a number of chains 108-122 each attached to the base assembly 10 at one end and connected at the opposite end to a hook 124. A pair of chains, as shown at 108, are attached to the deltoid members 64; chains 110, 112 are attached to rear portions of each support member 36; and chains 114, 116, 118, 120, 122 are attached to laterally outward portions of cross members 22, 24, 28. The chains are sized and arranged to circumferentially hold an edge portion of a tire on the apparatus while the first frame assembly 12 and second frame assembly 14 are pivotally moved relative to the base assembly 10.

The movement of the frame assemblies and the tire holder is effected by hydraulic force controls in control boxes 48, 50 which direct hydraulic pressure from a pressure line 126 through line 128, 130 to opposite ends of the first hydraulic cylinder 70, through lines 132, 134 to opposite ends of the second hydraulic cylinder 86, and through lines 135, 136 to the hydraulic motor 100. The hydraulic fluid flow is individually controlled to each of the pistons and motor by levers 138, 140, 142. Hydraulic fluid is returned to a suitable pump (not shown) through a return line 144. Lever 138 controls the rotation of the hydraulic motor in either direction; lever 140 controls piston 86; and lever 142 controls piston 70. An eight to nine h.p. gasoline engine drives a gear type hydraulic pump at about ten g.p.m. to the hydraulic devices.

Figure 2:
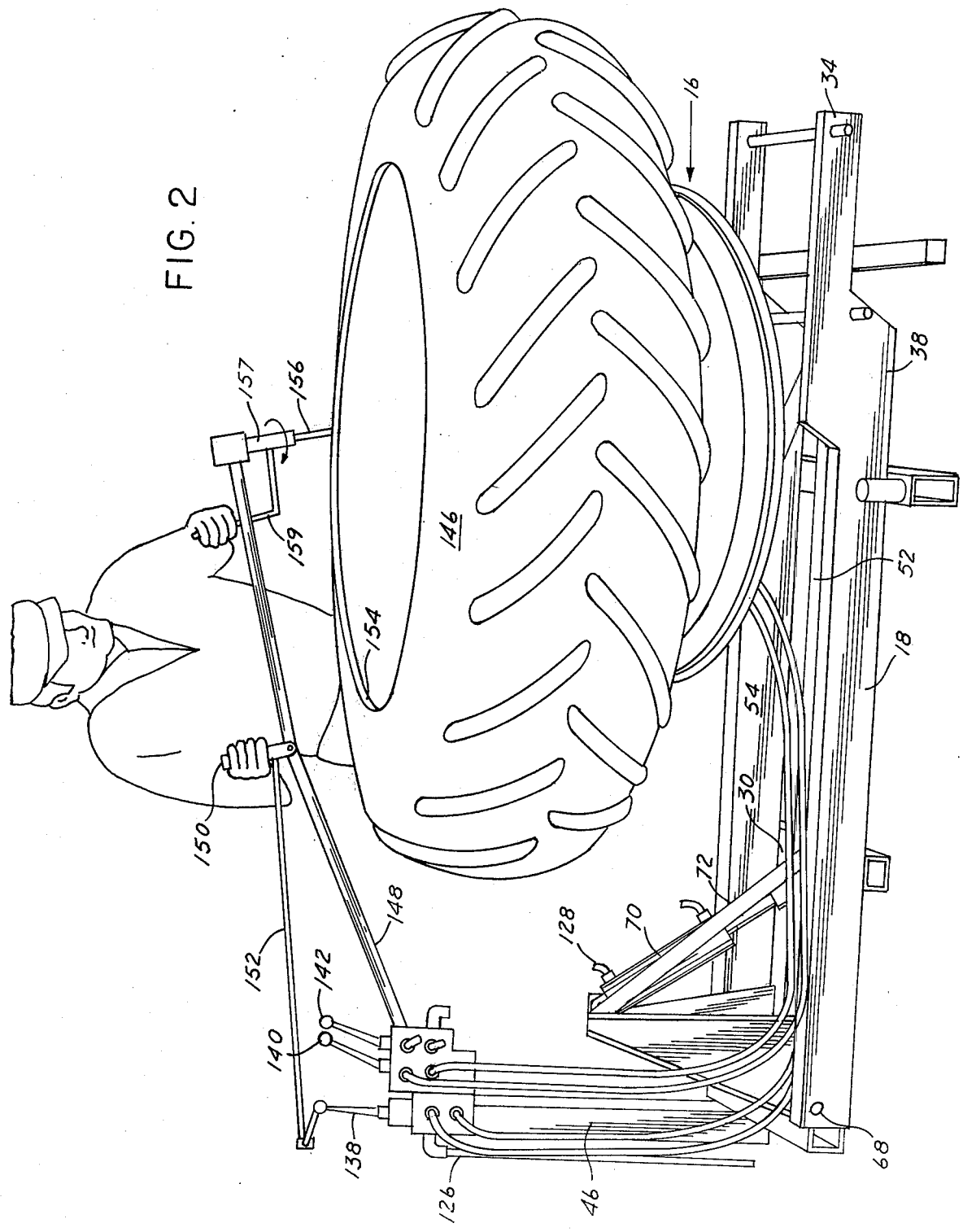
FIG. 2 is a side view of the apparatus of FIG. 1 in a prepatory stage of tire inversion, with parts removed for clarity.

As shown in FIG. 2, the first step in the process involves placing a tire 146, such as a large tractor tire, on its first side on the tire holder 16. A catch device or clamp (not shown) may be used to prevent slippage or rotation of the tire. A boom member 148 is then attached to the upright arm 46. The boom member 148 comprises a central, pivotable handle 150 for attachment to a long connecting rod 152 attached to the lever 138. The boom member 148 extends a distance beyond the nearest rim portion of the tire 146, so that it may be positioned at its end laterally opposite a rim 154 of the tire. At its end, the boom member 148 carries a curved cutting blade 156 extending downwardly towards the tire and fixed in a shaft 157 rotatably attached to the boom 148. As the tire 146 is rotated on the tire holder by the hydraulic motor 100, motor rotation is controlled by members 150, 152 which are operable during the cutting operation. The cutting blade 156 is controlled by the operator using a handle 159 extending from the rotatable shaft 157 to remove a circumferentially uniform rim portion about six inches (15 cm) wide to define a cut edge portion which receives the hooks 124. The rotatable shaft 157 makes the cutting edge of the knife steerable to any desired angle of attack against the rotating tire.

As shown in FIG. 3, the hooks 124 are next engaged with the edge portion of the tire in approximately equal spacing, and the first arm assembly 12 is then raised through extension of cylinder rod 72. Pivotally moving the first arm assembly causes the edge portion to be pulled from the second side 158 along a substantial forward portion of the circumference of the tire as the first rim portion 162 of the tire is, in effect, pushed upward through the central opening of the tire. The first cylinder 70 is held in extended position and the second cylinder 86 is then extended to pivot the second arm assembly 14 into the position shown in FIG. 1 to push the remaining first rim portion 162 beyond the edge portion 158 retained by chains 108, 110, 112, thereby inverting the tire. The second cylinder 86 is then retracted to position the tire 146 in a substantially horizontal position shown in FIG. 4. Any bulges in the inverted tire are then smoothed by clamping means 164.

The clamping means 164 comprises a first clamping element 166 and a second clamping element 168 pivotally attached to the first through a pin 170 and bracket 172. The first clamping element 166 comprises a stand portion for positioning the clamping means on the ground, an elongated portion extending therefrom, and an upwardly angled portion extending through the bracket 172 terminating in a concave first clamping surface 174 shaped to the final surface configuration of the originally interior surface of the inverted tire. The second clamping element 166 comprises a handle portion, an elongated portion extending therefrom, an upwardly extending portion, and a convex second clamping surface 176 shaped to the final surface configuration of the originally exterior surface of the inverted tire. The first and second clamping surfaces 174, 176 are oppositely disposed on their respective upwardly extending portions so that downward force on the second clamping element 168 forces the clamping surfaces towards each other and smooths the portion of the tire 146 between the surfaces. After smoothing the tire, the first cylinder 70 is retracted and the inverted tire is removed.

Figure 4:
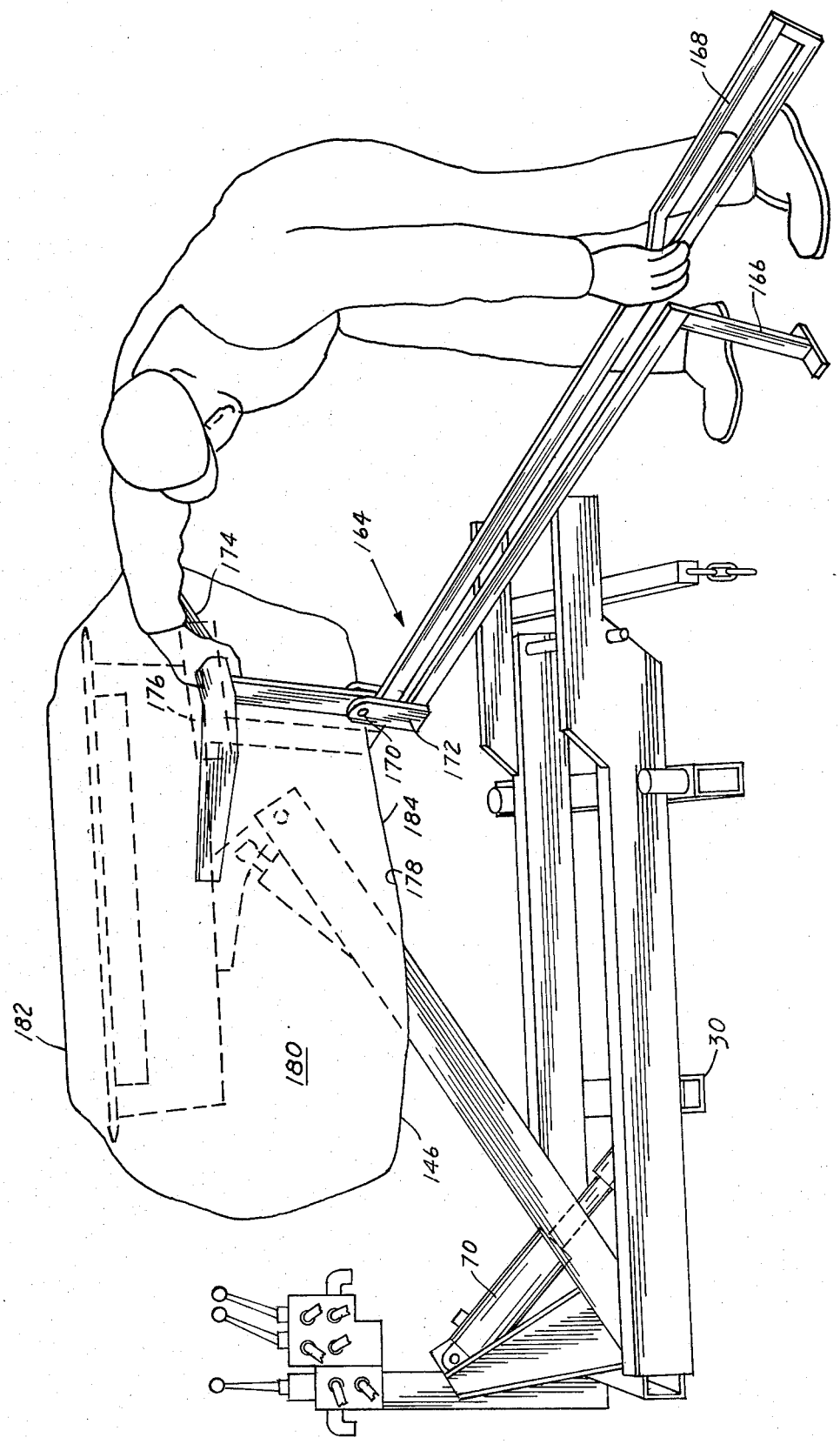
FIG. 4 is a side view of the apparatus of FIG. 3 in a final stage of tire inversion, with parts removed for clarity.

The tire thus produced has a generally cylindrical shape, as shown in FIG. 4, defined by a first concave surface 178, an opposite convex surface 180, a first edge formed by the first rim 162, and a second edge 184 formed by removal of the rim portion 154.

Thus there has been described an apparatus for forming an inverted tire of a generally cylindrical shape, with an inwardly tapered end portion, useful as a feed bunk or for other purposes. The present apparatus is compact, due to the folding arm arrangement, and portable to allow transportation of the apparatus to various sites. The only external support necessary to the apparatus is a source of hydraulic pressure. The present method can be carried out in approximately ten minutes for economically efficient implementation.

While the foregoing invention has been described with reference to an exemplary and presently preferred embodiment, it is to be understood that other steps and structure may be used to carry out the present invention within the scope of the appended claims.

What is claimed is:

1. Apparatus for inverting a tire having a first side and an axially spaced second side, comprising:
   tire holding means for holding said tire on said first side;
   grappling means for circumferentially holding an edge of the second side of the tire relative to movement of said tire on said tire holding means, said grappling means being fixed relative to the tire molding means;
   first tire moving means for moving said tire, on said tire holding means, in a first direction relative to said grappling means to axially displace a first edge portion;
   second tire moving means for moving said tire, on said tire holding means, in a second direction relative to said grappling means to axially displace a second edge portion;
   said first edge portion and said second edge portion together constituting the entire edge, whereby the edge is axially displaced relative to the first side to invert the tire.

2. The apparatus of claim 1 further comprising: means for rotating said tire holding means.

3. The apparatus of claim 2 further comprising:
   a steerable cutting blade to remove a rim portion from said second side.

4. The apparatus of claim 3 further comprising:
   a boom member, detachably mountable on said apparatus, for supporting said cutting blade in a fixed position during rotating of said tire holding means.

5. The apparatus of claim 1 further comprising:
   clamping means for smoothing said tire by pressing a first, initially outer, tire surface towards a second, initially inward, tire surface.

6. The apparatus of claim 5 wherein said clamping means comprises:
   a first clamping element held in a fixed position and having a first clamping surface engageable with said second tire surface; and
   a second clamping element pivotable relative to said first clamping element and having a second clamping surface, opposite said first clamping surface, engageable with said first tire surface.

7. The apparatus of claim 1 further comprising:
   a base assembly supporting said tire holding means, said grappling means, and said first and second tire moving means.

8. The apparatus of claim 7, wherein said first tire moving means comprises a first arm pivotably connected to said base assembly.

9. The apparatus of claim 8 wherein said second tire moving means comprises a second arm pivotably connected to said first arm at an end of said first arm opposite the end connected to said base assembly.

10. The apparatus of claim 9 wherein said tire holding means comprises an annular member of slightly greater radius than a rim portion of said first side.

11. The apparatus of claim 10 wherein said grappling means comprise a plurality of hook members for circumferentially spaced axially and radially outwardly fixed attachment to said edge portion of the tire.

12. The apparatus of claim 10 further comprising:
   a hydraulic motor, on said tire holding means, for rotating said tire holding means relative to a tire holder hub fixed on said second arm.

13. The apparatus of claim 12 wherein said first arm is operatively associated with a first hydraulic cylinder and said second arm is operatively associated with a second hydraulic cylinder.

14. The apparatus of claim 1 wherein said first direction of said first tire moving means and said second direction of said second tire moving means are axially and radially angled relative to said tire.

* * * * *